J. M. SKINNER.
STORAGE BATTERY CONSTRUCTION.
APPLICATION FILED MAY 11, 1916.
1,228,250.
Patented May 29, 1917.
2 SHEETS—SHEET 1.
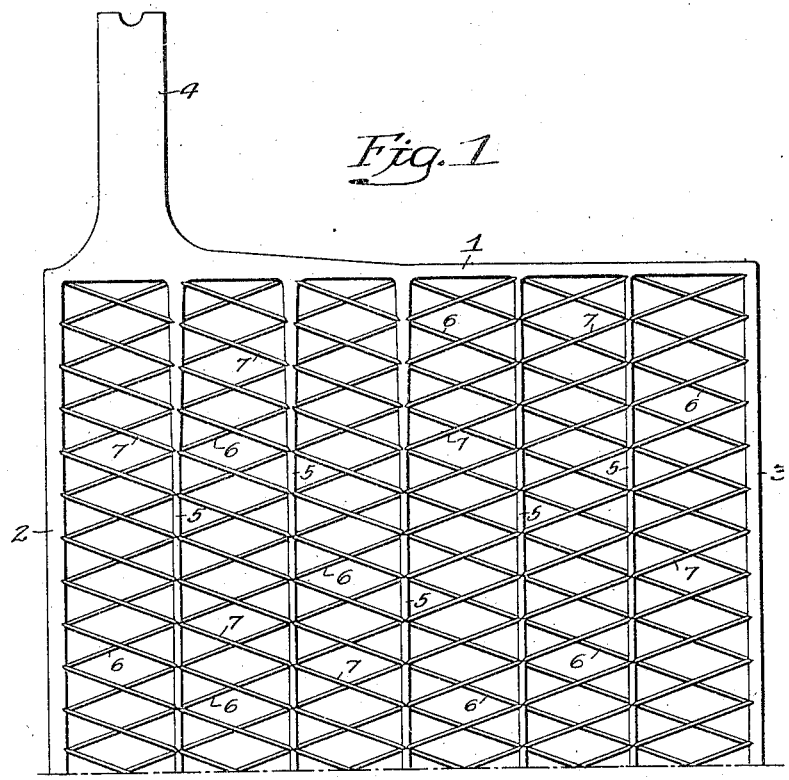
Fig. 1.
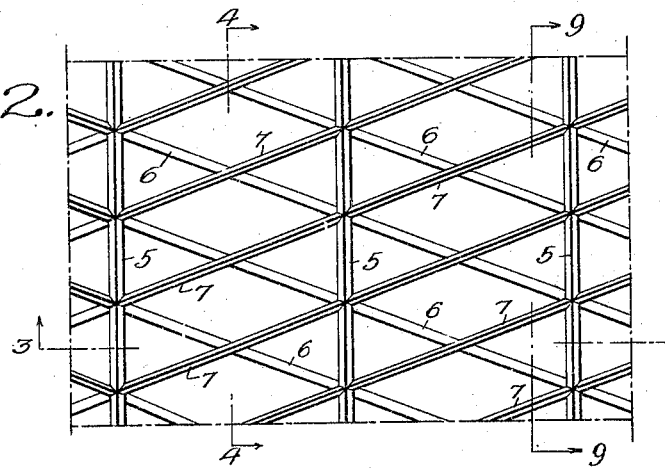
Fig. 2.
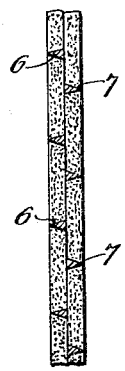
Fig. 9.
Fig. 3.
Fig. 4.
Inventor.
James M. Skinner
by his Attorneys
Howson & Howson

J. M. SKINNER.
STORAGE BATTERY CONSTRUCTION.
APPLICATION FILED MAY 11, 1916.

1,228,250.

Patented May 29, 1917.
2 SHEETS—SHEET 2.

Inventor.
James M. Skinner,
by his Attorneys
Howson & Howson

UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

STORAGE-BATTERY CONSTRUCTION.

1,228,250.  Specification of Letters Patent.  Patented May 29, 1917.

Application filed May 11, 1916. Serial No. 96,852.

*To all whom it may concern:*

Be it known that I, JAMES M. SKINNER, a citizen of the United States, residing in Philadelphia, Pennsylvania, have invented a Storage-Battery Construction, of which the following is a specification.

One object of my invention is to provide a storage battery grid whose construction shall be such as to give a maximum proportion of active material in the external surface and parts adjacent thereto in the finished plate or electrode; the invention particularly contemplating a novel cross section for the grid members which, beside providing structural strength and better holding surface for the active material, shall at the same time occupy or constitute as little as possible of the portions of the electrode adjacent the surface after said material has been applied.

Another object of the invention is to provide a novel form of storage battery grid in which the members shall be so constructed as to provide maximum resistance to buckling and be so arranged as to reinforce each other at what would otherwise be comparatively weak portions, with a view to preventing their bending or deformation by the pressure necessarily exerted in applying the active material.

I further desire to provide a storage battery electrode which shall have its active material and supporting grid so proportioned and arranged relatively to each other that it shall have a maximum capacity and voltage under operating conditions as well as a maximum mechanical strength.

These objects and other advantageous ends I secure as hereinafter set forth, reference being had to the accompanying drawings, in which, Figure 1 is an elevation of the upper portion of a storage battery grid constructed according to my invention;

Fig. 2 is a fragmentary elevation of a portion of the grid shown in Fig. 1;

Figs. 3 and 4 are transverse sections on the lines 3—3 and 4—4, Fig. 2, showing the active material in place;

Figure 5:
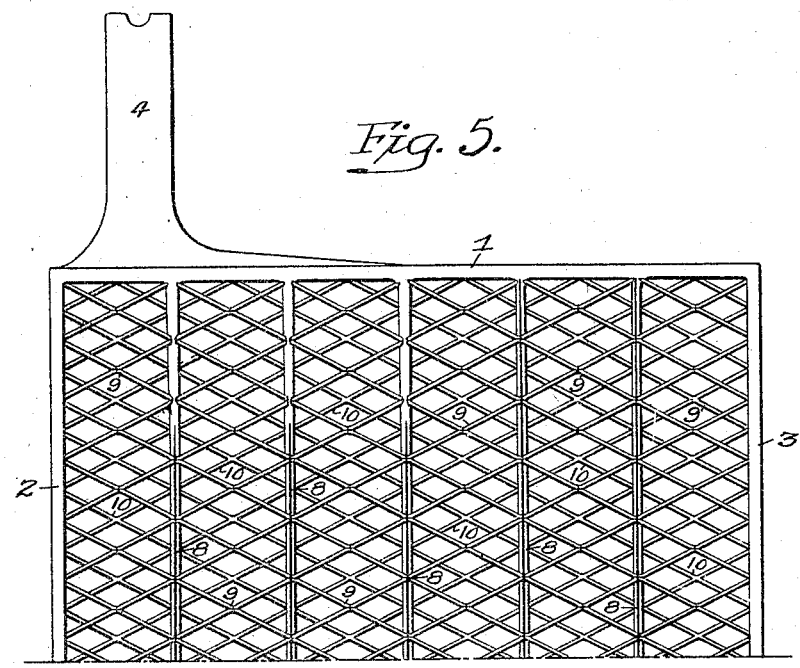
Fig. 5 is an elevation of part of another style of storage battery grid embodying one of the features of my invention.
Figure 6:
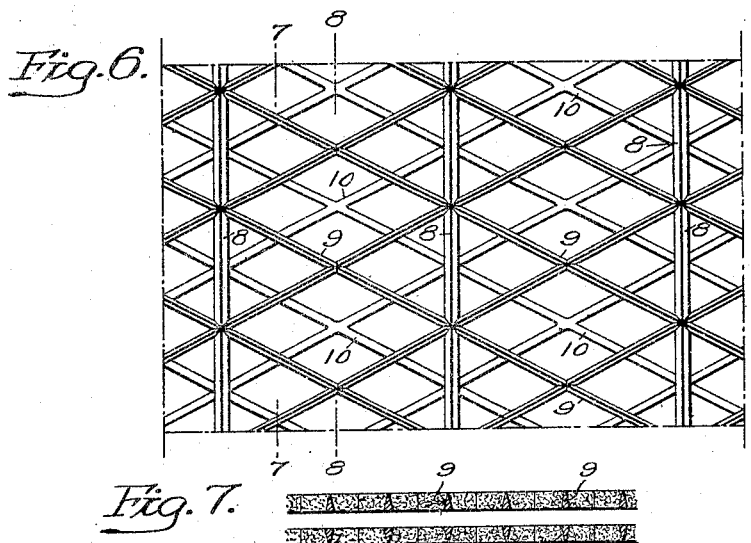
Fig. 6 is a fragmentary elevation of part of the grid shown in Fig. 5.
Figure 7:
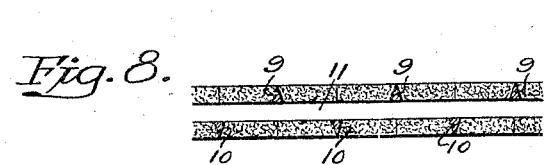
Figure 8:
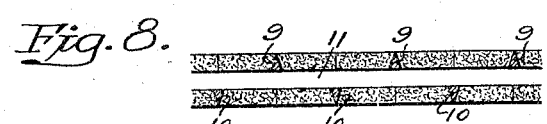

Figs. 7 and 8 are sections on the lines 7—7 and 8—8, Fig. 6, showing the active material in place; and Fig. 9 is a transverse section on the line 9—9, Fig. 2.

In Figs. 1 to 4 of the above drawings, 1 represents the top and 2 and 3 the side frame members of a storage battery grid of the so-called "herring bone" type which includes a lug 4 projecting from the member 1 and a series of members 5 all parallel with the side members 2 and 3. Said members 5 are preferably thickened as they approach the top member 1 and the latter is likewise thickened as it approaches the lug 4.

Each pair of adjacent members 5 as well as the side members 2 and 3 with their adjacent members 5, are connected by two sets of oppositely inclined lattice members 6 and 7 which are each of an acute triangular section and so arranged that their flat base portions lie in the same plane. As a result of this construction, the flat inner face of each of the members 6 at its middle portion engages and is coincident with the flat face of one of the members 7, so that said members are integral at their central portions as indicated in Fig. 4. Owing to their acute angular section, the members 6 and 7 may for example, each have a height approximately equal to twice the width of its base, and their sides at an angle of about 30°, intersecting each other in relatively sharp, line edges in the planes of the outer faces of the grid, which usually though not necessarily include the faces of the side members 2 and 3 as well as the acute angle edges of the partition members 5.

In applying active material to grids of the above construction, which is particularly applicable to thin plates, the latter may be laid upon flat blocks or plates and said material in a pasty or plastic state may be applied by means of suitable paddles; being forcibly pressed into the space defined by the various members. Not only is the active material locked in place because of its being forced under and around certain of the inclined members, but it is noted that owing to the acute outer edges of these latter there is a minimum of the grid exposed on and immediately adjacent the outer face of the finished electrode.

With my construction this exposed surface, formed by the edges of the various inclined members 6 and 7 and by the partition members 5, takes the form of lines of inconsiderable width, and since both the capacity and the voltage of a battery using such an electrode is dependent, among other things, upon the active material at or near the surface actually presented to and in contact with the electrolyte, it will be understood that a battery made of electrodes having grids of the construction shown, will give better results than those of any other construction, with which I am familiar. Moreover since each of the inclined members is engaged and supported by another member, none of the members is liable to be bent during the pasting operation by the pressure exerted in forcing the active material into the various pockets or recesses of the grid.

The same advantages arising from the use of connecting members of acute angular section are found in grids of the construction shown in Figs. 5 to 8 inclusive, which is particularly applicable to thick plates, where the lattice members between the partition members 8, are arranged in two sets 9 and 10 lying in parallel planes but spaced apart as shown in Figs. 7 and 8. In the form of grid shown, which is commonly known as the "diamond" type, the members 9 and 10 of each adjacent pair intersect each other, and are as before of acute angular section, so that when the active material is forced into the spaces 11 between their planes and also into the spaces between them, it completely incloses all but the sharp line edges which alone are exposed on the external surfaces of the finished electrode. In this case also the planes of the external edges of the connecting members may or may not include the faces of the side and partition members. In this case, said members 9 and 10 are designed to have sufficient structural strength to resist deformation incident upon the pasting operation.

Here as before the electrodes possess a maximum capacity consistent with the conditions necessarily existing in connection with their manufacture and construction, since while the narrow line-like edges of the various frame members are exposed on the outer surface of the grid, their area and volume is relatively small as compared with the area and volume of the surface active material which they support, and since such area and volume of active material at or near the surface is the most important factor in determining the capacity of the cell in which the electrodes are used, I have found that by reducing the exposed surface of the connecting lattice members to a minimum, the capacity of the cell may be increased from five to ten per cent. Obviously the invention is equally applicable to grids of types other than the "herring bone" and "diamond" illustrated.

It is to be noted that without departing from my invention the diamond type grids may be made without the spaces between the two sets of connecting members as illustrated in Figs. 3 and 4, and vice versa, the herring bone grids may be constructed with spaces between their sets of connecting members as shown in Figs. 7 and 8.

One important advantage arising from the acute angular construction of the connecting members is due to the reduction in the outward component of the force arising from the expansion of the active material lying between said members. Such reduction diminishes the tendency of blocks or large masses of said material to be bodily detached from the electrode.

I claim:—

1. A storage battery grid having a frame including two sets of connecting members of acute angular section lying in substantially parallel planes, the members of one set lying respectively in parallel planes intersecting other parallel planes including the members of the second set.

2. A storage battery electrode consisting of a frame having side members; a series of partition members; two sets of oppositely inclined connecting members between said partition members, each having an acute angular cross section and lying in parallel planes; with active material carried by the frame and having at least two exposed surfaces, each of which includes the line-like edges of one of the sets of connecting members.

3. A storage battery electrode consisting of a frame having side members; a series of partition members; two sets of oppositely inclined connecting members extending between said partition members and between the partition members and the side members, the members of one set lying respectively in parallel planes intersecting other parallel planes including the members of a second set, each of the members of one set crossing and having an integral engagement with at least one member of the other set.

4. A storage battery grid including two sets of connecting members having flat base portions lying in the same plane, the flat base portion of each of said members being engaged by the flat base portion of another member, and being integral therewith at such point of engagement.

5. A storage battery grid consisting of a frame having two sets of connecting members, said members of each set being of an acute angle section and having a flat base lying in the plane of the flat base of the members of the other set, the base of each member being intersected by and integral with another member.

6. A storage battery grid including two sets of intersecting connecting members having flat base portions lying in the same plane, the flat base portion of each of said members being engaged by the flat base portion of another member, and being integral therewith at such point of engagement; with active material carried by said grid and inclosing said members.

JAMES M SKINNER.